United States Patent [19]
Allain et al.

[11] 3,928,440
[45] Dec. 23, 1975

[54] ACRYLONITRILE HYDROLYSIS AND CATALYST USEFUL THEREFOR

[75] Inventors: Ronald J. Allain, Brookhaven, Miss.; Virgil L. Seale, Houston, Tex.

[73] Assignee: Nalco Chemical Company, Chicago, Ill.

[22] Filed: July 29, 1974

[21] Appl. No.: 492,865

[52] U.S. Cl......... 260/561 N; 252/476; 252/477 Q; 260/557 R; 260/558 R
[51] Int. Cl.$^2$................................. C07C 103/08
[58] Field of Search........ 260/557 R, 558 R, 561 N; 252/463, 476, 477 Q

[56] References Cited
UNITED STATES PATENTS
3,767,706  10/1973  Habermann et al. ............ 260/561 N
3,809,658  5/1974  Csuros et al. .................... 252/477 Q FOREIGN PATENTS OR APPLICATIONS
44-8987  4/1969  Japan
44-8988  4/1969  Japan .............................. 252/477 Q
44-9459  5/1969  Japan
2,240,783  2/1973  Germany OTHER PUBLICATIONS
Chem. Abs., 72, 3109.
Chem. Abs., 72, 3110.
Chem Abs., 71, 123602.
Chem. Abs., 79, 32384.

*Primary Examiner*—C. Davis
*Attorney, Agent, or Firm*—Hill, Gross, Simpson, Van Santen, Steadman, Chiara & Simpson

[57] ABSTRACT

An improved process for making acrylamide from a starting composition of acrylonitrile and water using a copper catalyst prepared by contacting a particulated copper/aluminum alloy with water. The acrylamide producing process using such catalyst can be practiced continuously for extended periods of time at high reaction rates with high conversion yields even when employing concentrated acrylonitrile starting feeds.

7 Claims, No Drawings

ACRYLONITRILE HYDROLYSIS AND CATALYST USEFUL THEREFOR

BACKGROUND OF THE INVENTION

In the art of catalytically hydrolizing acrylonitrile with water to acrylamide, various copper and copper containing catalysts have heretofore been proposed, such as mixtures of copper oxide with other metal oxides, reduced copper oxides/metal oxide mixtures, copper and copper/metal mixtures, Raney Copper, and the like (see, for example, U.S. Pat. Nos. 3,597,481; 3,631,104; 3,642,894; 3,767,706; and 3,642,643; German Pat. No. 2,036,126; German DOS 2,164,185; Canadian Pat. No. 899,380; and Japanese Patent Publication 69/5205).

So far as can be determined, when using, for example, a Raney copper catalyst to hydrolize acrylonitrile to acrylamide by the teachings of the prior art, it has been the practice to prepare or activate such catalysts by contacting particulated copper aluminum alloy with aqueous alkaline metal hydroxide to dissolve away at least a portion of the aluminum. Copper catalysts so prepared apparently can contain as a surface contaminant quantities of aluminate. Apparently, these aluminates when present in or on a copper catalyst adversely affect catalyst activity.

So far as is known, no one has heretofore used for such a nitrile hydrolysis a copper catalyst which has been activated with water alone. Even such a water activated catalyst itself does not appear to have been known to the prior art.

BRIEF SUMMARY OF THE INVENTION

The present invention is directed to an improved process for making acrylamide from a starting composition comprising acrylonitrile and water by catalytic hydrolysis. Typically a starting composition for such process comprises from about 10 to 75 weight percent acrylonitrile with the remainder up to 100 weight percent thereof being water. Preferably, such composition contains from about 30 to 40 weight percent acrylonitrile (same basis). This process is conducted under aqueous liquid phase conditions using temperatures in the range of from about 150° to 300° F with temperatures of from about 160° to 250° F being presently preferred.

The process involves contacting such a composition with a copper catalyst which has been activated with water having a pH in the range of from about 5.5 to 7.5. The water used is preferably distilled or deionized, though surface water, tap water and drinking water may be used if desired provided the pH thereof is in the range indicated. Preferably, the water used for activation contains not more than about 2 weight percent dissolved solids (100 weight percent total basis), and more preferably such water contains less than 1 percent and still more preferably less than about 0.01 percent dissolved solids. The so-activated catalyst is in the form of particles whose average diameter typically range from about 0.002 to 0.5 inch. In one aspect, this invention can be considered to include this catalyst as such as well as the process for making the same.

Because of the characteristically long life associated with such a catalyst prepared and used in the practice of the hydrolysis process of the present invention, the present invention provides an improved catalytic acrylonitrile hydrolysis process which can be operated continuously and for extended periods of time with the same catalyst to produce desired, economically significant, high conversion yields of acrylamide frm acrylonitrile at economically significant high rates of conversion.

A particularly preferred form of the present invention utilizes such a catalyst which has a high or maximized initial catalytic activity. The invention is particularly useful, and the foregoing advantages are particularly well demonstrated, when using starting acrylonitrile/water compositions containing a high or concentrated acrylonitrile content.

The hydrolysis process of this invention offers operating efficiencies and economies, particularly in batch or continuous processes employing fixed bed catalysts. The process of this invention also allows operations for surprisingly long periods of time.

The present invention further provides an improved technique for activating a copper catalyst for use in such a hydrolysis process.

Further, the present invention aims to provide a water activated copper catalyst which is adapted to permit one to hydrolyze acrylonitrile to acrylamide substantially free of by-product formation.

Also, the present invention provides a technique for preparing a water activated catalyst wherein the catalyst is washed following activation with water with a solution of an additive.

Other and further aims, objects, purposes, advantages, utilities and features will be apparent to those skilled in the art from a reading of the present specification.

DETAILED DESCRIPTION

The catalyst used in the practice of the present invention is a copper catalyst which has been activated with water having a pH of from about 5.5 to 7.5, as indicated. Characteristically, the starting material for this catalyst is a preformed binary metal alloy compound comprised of copper and aluminum having a weight ratio of aluminum to copper in the range of from about 70:30 to 30:70 (preferably from about 45:55 to 55:45, and most preferably about 50:50). Minor amounts of other materials, such as metals or oxygen, may be present in a starting alloy. The alloy particles further initially have an average particle diameter in the range of from about 0.002 to 0.5 inch.

The starting alloy particles are contacted with water as indicated for a period of time at least sufficient to produce evolution of hydrogen gas such as can be visually detected in the form of bubbles issuing from the particles while immersed in water. Preferably, the contacting with water is continued not only until hydrogen evolution is observed, but until, at a subsequent time, the starting alloy particles change color from their initial white or silvery appearance to a coppery color or dark color approaching black. More preferably, the contacting of particles with water is continued not only up to the time when such a color change is observable visually, but for a period of time which is at least 100 hours approximately thereafter. Apparently, particles can be contacted with water for an indefinitely long period of time in the production of a catalyst in accord with the teachings of this invention, but periods of time longer than about two or three months are believed not to result in appreciable further enhancement of catalytic activity.

During contacting, the particles may be contacted with circulating or noncirculating water. For example, the particles can be maintained in an enclosed area continuously during the entire period of contacting using the same water, or, alternatively, the particles during contacting can be exposed to water flowing over and through the particles. Such flowing water can be continuously reused so that no fresh water is introduced into the contacting system, or, alternatively, fresh water can be continuously added to the system, thereby replacing, optionally, in whole or in part, the water initially present in such a flowing water contacting system. Preferably, a large excess from a volumetric or weight standpoint of water relative to particles is employed during a contacting operation. Thus, preferably, at least a 10-fold volumetric excess is employed, and more preferably at least about a 100-fold volumetric excess of water is employed.

The temperature employed during contacting can range from about 0° to 40° C with ambient or room temperatures being preferred. Atmospheric pressures are preferably employed though superatmospheric and subatmospheric pressures can be used.

During the contacting, aluminum is effectively removed from the starting particles. The exact nature of the chemical reaction involved is not understood at this time.

Particularly when a batch type contacting procedure is employed without the use of circulation of water, as the contacting progresses, the system appears to produce more or less as a by-product a light colored whitish or grayish white material which material tends to be in a solid form and to be located in the vicinity of and adjacent to the metal particles themselves eventually. It is theorized that such material may be insoluble aluminates, though there is no intent herein to be bound by theory.

After a contacting operation, the resulting particles are washed to remove any foreign material present. The washing may be accomplished with fresh water having a pH of from about 5.5 to 7.5. When continuous circulation using continuously supplied fresh water is utilized during a contacting operation, no post-washing operation need be employed. However, in accord with the preferred practice of the present invention, following a contacting operation, the resulting particles are washed with water having dissolved therein an additive.

In general, the additives used in the practice of the process of the present invention are hydroxylated hydrocarbon compounds characterized by having at least two carbon atoms per molecule and by having at least two groups per molecule each of which is independently selected from the class consisting of hydroxyl, carboxyl, aldehyde, alkali metal carboxylate and esterified carboxylate, at least one of said groups being hydroxyl. Preferably, such a hydroxylated hydrocarbon compound has at least three carbon atoms per molecule, and at least three groups per molecule each of which is independently selected from the class consisting of hydroxyl, carboxyl, aldehyde, alkali metal carboxylate and esterified carboxylate, at least one of said groups being hydroxyl.

A preferred class of catalysts as taught by the present invention characteristically and typically comprises from about 2 to 45 weight percent aluminum with the balance up to 100 weight percent thereof being copper in any given catalyst.

After being contacted with such an aqueous solution of additive, the resulting particles may, if desired, be finally washed with water having a pH in the range indicated.

The resulting group of water activated catalyst particles is interveningly optionally stored before being used in the hydrolysis process of this invention. When stored under water, the catalyst is conveniently kept in drums or the like prior to charging to a reactor or the like for use in the practice of the hydrolysis process. Keeping the catalyst under water prevents oxidation by air which occurs rapidly and undesirably if the catalyst is allowed to have oxygen exposure.

One preferred group of hydroxylated hydrocarbon compounds suitable for use in the present invention comprises polyhydroxylated aliphatic carboxylic acids. One class of such acids suitable for use in the present invention is characterized by the formula:

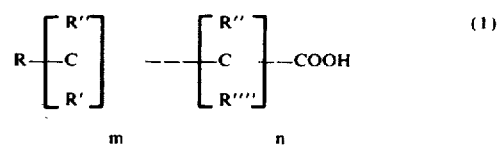

where:
R, R', R'', R''' and R'''' are each independently H, lower alkyl, —OH, or —COOH provided that at least one of R, R', R'', R''' and R'''' is hydroxyl and that at least one other of such R, R', R'', R''' and R'''' groups is either carboxyl or hydroxyl,
$n$ is an integer of from 2 through 8 (4 through 8 being preferred),
$m$ is an integer of from 0 through 4.

It will be readily appreciated by those skilled in the art that one can employ, in place of, or in addition to, those compounds of formula (1), carboxylate salts (such as alkali metal salts and ammonium salts) and carboxylate esters (such as lactones and esters with lower aliphatic alcohols) which will, in alkaline water solution, form the same anions as do the compounds of formula (1).

Examples of particular compounds within the scope of formula (1) include: gluconic acid, glucaric acid, saccharinic acid, and the like.

One more preferred class of hydroxylated hydrocarbon compounds within the scope of formula (1) above is characterized by the formula:

R—(CHOH)$_n$—COOH (2)

where:
R is selected from the group consisting of —CH$_3$, —CH$_2$OH, —COOH, —CHO, and —H, and
$n$ is an integer of from 1 through 5.

Examples of particular compounds within the scope of formula (2) include gluconic acid, glucaric acid, tartaric acid, d-glucuronic acid, and the like.

Examples of compounds suitable for use as additives during contacting in accord with the teachings of this invention which are similar to compounds within the scope of formula (1) or of formula (2) include alkali metal salts (sodium being presently preferred) of gluconic acid, tartaric acid, or citric acid, lactones, such as glucono-δ-lactone, and the like.

Another class of hydroxylated hydrocarbon compounds includes aliphatic polyhydroxylated compounds with at least three carbon atoms and at least three hydroxyl groups per molecule. Such compounds can include as many as 12 to 15 carbon atoms in a given molecule. Examples include pentaerythritol, glycerol, and the like.

A more preferred class of such polyhydroxylated hydrocarbon compounds suitable for use with caustic in activating Raney copper catalysts for use in the practice of the present invention is characterized by the formula:

$$H-(CHOH)_n-CH_2OH \qquad (3)$$

where $n$ is an integer of from 3 through 8.

Examples of formula (3) compounds include sorbitol, mannitol, and the like.

Another class of hydroxylated hydrocarbon compounds suitable for use in the practice of the present invention for activating Raney copper catalysts with caustic includes saccharides (including mono, di, and polysaccharides). Examples include glucose, sucrose, corn starch, arabinose, and the like.

Preferred hydroxylated hydrocarbon compounds are substantially completely water soluble at the concentrations employed in the usual practice of this invention.

Presently most preferred hydroxylated hydrocarbon compounds include gluconic acid (and compounds which produce the gluconate ion in water solution, such as sodium gluconate, glucono-S-lactone, and the like) sorbitol, and glucose (dextrose).

Preferably in the practice of the preparation of a catalyst in accord with the teachings of the present invention, the starting alloy particles are maintained under water following preparation thereof so as to minimize any oxygen exposure thereof prior to a contacting procedure.

As indicated, during a contacting procedure of starting alloy with water, hydrogen gas is characteristically produced. Conveniently, the hydrogen gas is vented more or less at the rate generated from the reaction zone. If desired, the activation or contacting operation may be conducted under inert conditions, such as under a blanket of nitrogen gas or a gas of the helium family primarily to avoid forming an explosive mixture of hydrogen and oxygen.

The hydrolysis reaction of this invention proceeds even when the amount of the catalyst employed is very slight. For example, addition of a catalyst as taught by this invention in an amount of about 0.01 gram per mole of acrylonitrile is sufficient to make the reaction proceed. The greater the amount of catalyst used, the faster the reaction proceeds, in general, thus permitting an increase in the amount of acrylamide produced. Consequently, the amount of catalyst employed per mole of acrylonitrile initially employed can preferably range from about 0.01 to 100 grams, although more or less catalyst can be used, if desired.

Acrylamide may be made from a mixture of acrylonitrile and water in accordance with the teachings of the present invention using a suspension bed or a fixed bed of such catalyst. Combinations thereof may be employed. Two or more reactors may be connected in series and the reactant liquid and the catalyst may be countercurrently moved relative to each other to effect and enhance reaction.

The hydrolysis process may be practiced under atmospheric conditions but superatmospheric and subatmospheric pressures may be employed. Batch processing may be used but continuous is preferred.

When practicing the hydrolysis process of the present invention using a copper catalyst prepared as described herein and utilizing a suspension bed system, it is preferred to employ the catalyst in the form of particles at least 90 weight percent of which are in an average size range of from about 0.002 to 0.10 inch. Similarly, when the present invention is practiced using such a Raney copper catalyst in the form of a fixed bed system, it is convenient and preferred to use the catalyst in the form of particles at least 90 weight percent of which range in average size from about 0.02 to 0.50 inch.

Those skilled in the art will appreciate that a catalyst prepared as taught herein may undergo further preparation by procedures known to the prior art as desired before being utilized in a hydrolysis process as taught herein.

The amount of such additive employed as described hereinabove can vary widely, but usually quantities in the range of from about greater than 0 to about 30 weight percent (total solution basis) are convenient. The time of exposure to such an additive can vary widely with no particular criticality being presently observed to be associated with the time of additive contact with particles. Ethylene glycol may be used but typically larger amounts of such an additive are employed compared to other hydroxylate hydrocarbon compounds generally.

When to a sample of deionized water having a pH of 5.6 (which generally characteristically appears to have a pH ranging from about 5.6 to 6.0, though higher and lower pH values therefor are common) is added, for example, a 1/10 sodium hydroxide solution dropwise, one drop lowers the pH of the sample of deionized water to 4.85, two drops lowers the pH of the sample to 4.25, and then each succeeding drop added after that raises the pH. Twenty drops of such 1/10 normal sodium hydroxide solution raises the pH to 7.58. Twenty such drops is equivalent to 0.004 grams of sodium hydroxide per thousand grams of water, so a pH of 7.58 indicates a solution containing 0.004 grams NaOH per 1000 grams $H_2O$ which is equivalent to 0.0004 weight percent caustic. The reason for the effect is not clear, but it is thought that this water used here contains dissolved materials, perhaps calcium or magnesium silicates, so that when NaOH is added thereto, the silicates (or other dissolved common material) are released from a buffering action provided by the deionized water, so that the water becomes acidic. Further, addition of the NaOH serves to neutralize this acidity. Tap water similarly evaluated displayed analogous behavior. Even simple distilled water displays a somewhat analogous behavior apparently ultra-high purity distilled water is needed to avoid such behavior. The usual behavior most water displays when caustic is initially added thereto is a lowering of pH. Theoretical calculations show that a 0.01 weight percent caustic (NaOH) solution has a pH of 9.4, and that a 0.001 weight percent NaOH solution has a pH of 8.4, and that a 0.0001 weight percent NaOH solution has a pH of 7.4.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE 1

Catalyst Preparation 500 grams of 50:50 weight ratio copper/aluminum alloy in the form of particles of 6 to 8 mesh size are allowed to stand under 3½ liters of deionized water for 2½ months without agitation in a flask after which the resulting particles were first washed with fresh deionized water and then for 5 minutes with an aqueous solution of 50 grams of sodium gluconate in 3.5 liters of deionized water. Finally, the particles were washed with deionized water to a pH of 7.5. Ambient (room) temperatures were used at all times. The product particles (catalyst) are stored under deionized water and are usually free from all visible signs of the white precipitate. The washing with sodium gluconate solution appeared to facilitate separation and removal of the white precipitate.

About one day after the particles were initially so immersed in the water, fine bubbles began to be slowly evolved and this evolution continued during the entire 2½ months of immersion. After about one week, a milkiness or cloudiness appeared in the water, and after about two weeks a definite precipitate began depositing loosely on the particle surfaces and elsewhere on the bottom of the flask. The particles were initially white or silvery in color and gradually changed, first to a copper color (within about two weeks), then to a dark color and finally to a black color. The precipitate was white in color.

EXAMPLE 2

Catalyst Preparation

The procedure of Example 1 is repeated except that the wash with sodium gluconate solution is eliminated. The product, water washed particles, are visually free of all visible signs of white precipitate.

EXAMPLE 3

Use of Catalyst in Hydrogen Reaction

The catalyst prepared as described in Example 1 and having a particle size of 6 to 8 mesh is charged to a stainless steel pipe having an inside diameter of 1½ inches so as to produce in the pipe a fixed catalyst bed about 25 centimeters in length. The bed contact volume (or void volume) is 85 milliliters. The pipe is jacketed with three sections of electric heating coils and is mounted in a vertical configuration. Bottom and top ends of the pipe are fitted with hose connections, and the assembly is appropriately instrumented so as to provide a continuous tube type reaction.

Into the bottom of the column is continuously charged 94 grams of acrylonitrile per hour and, also, simultaneously 246 grams of deionized water per hour. The effluent from the top of the column is not recirculated. Jacket temperature is maintained at about 95°–105° C. Immediately after steady state conditions are achieved, the percent conversion of acrylonitrile to acrylamide is determined by sampling the effluent and analyzing the actual percent acrylamide present in a gas chromatograph. The initial conversion is then calculated to be about 71.4 percent.

The column is thus continuously operated for about 142 hours. About once every 24 hours, the effluent is sampled and the percent conversion of acrylonitrile to acrylamide is similarly measured by a gas chromatograph. At the end of 142 hours, the percent conversion is found to be about 56.6 percent, the average conversion over the entire run is about 64 percent.

EXAMPLE 4

The catalyst prepared as described in Example 2 and having a particle size of 6 to 8 mesh is charged to a stainless steel two-liter autoclave with 880 grams of water and 420 grams of acrylonitrile. Sufficient catalyst is charged so as to provide about 10 percent catalyst loading based on acrylonitrile, that is, about 42 grams of copper. The autoclave controls are heated to about 105° C and the contents are agitated. The time necessary to produce a one-phase reactant system from the initially two-phase starting system is noted. The system remains in two phases until about 65 percent conversion of acrylonitrile to acrylamide is achieved. In this instance, a one-phase system is achieved in about 4½ hours.

EXAMPLE 5

The procedure of Example 1 is repeated except that in place of sodium gluconate there is employed sorbitol in the same concentration.

EXAMPLE 6

The procedure of Example 3 is repeated using the catalyst of Example 5. Approximately the same rates of conversion are achieved.

The claims are:

1. In a process wherein acrylonitrile is hydrolyzed with water in the presence of a copper catalyst, the improvement which comprises using as said catalyst a particulate copper catalyst which has been prepared by contacting alloy particles comprised of copper and aluminum wherein the weight ratio of aluminum to copper ranges from about 70:30 to 30:70 with water having a pH in the range of from about 5.5 to 7.5 for a time sufficient to produce evolution of hydrogen gas from such particles.

2. The process of claim 1 wherein the starting alloy particles have average particle diameters in the range of from about 0.002 to 0.5 inch.

3. In an improved process for preparing a copper catalyst, the improvement which comprises contacting alloy particles comprised of copper and aluminum wherein the weight ratio of aluminum to copper ranges from about 70:30 to 30:70 with water having a pH in the range of from about 5.5 to 7.5 for a time sufficient to produce evolution of hydrogen gas from such alloy particles.

4. The process of claim 1 wherein after said contacting, said particles are washed with an aqueous solution which has dissolved therein on a 100 weight percent total solution basis from greater than 0 to about 25 weight percent of at least one hydrocarbon compound, said hydrocarbon compound having at least two carbon atoms per molecule and having at least two groups per molecule at least one of such groups being hydroxyl, the other of said groups being selected from the class consisting of hydroxyl, carboxyl, aldehyde, alkali metal carboxylate and esterified carboxylate.

5. The process of claim 4 wherein said hydrocarbon compound has at least three carbon atoms per molecule, and at least three groups per molecule, two of which are each independently selected from the class consisting of hydroxyl, carboxyl, aldehyde, alkali metal carboxylate and esterified carboxylate, the third of said groups being hydroxyl.

6. The process of claim 1 wherein said copper catalyst is comprised of from about 2 to 45 weight percent aluminum with the balance up to 100 weight percent thereof being copper.

7. The process of claim 3 wherein said copper catalyst is comprised of from about 2 to 45 weight percent aluminum with the balance up to 100 weight percent thereof being copper.

* * * * *